July 19, 1938.　　　　K. L. CHILDS　　　　2,124,186
FRYING APPARATUS
Filed Dec. 4, 1936
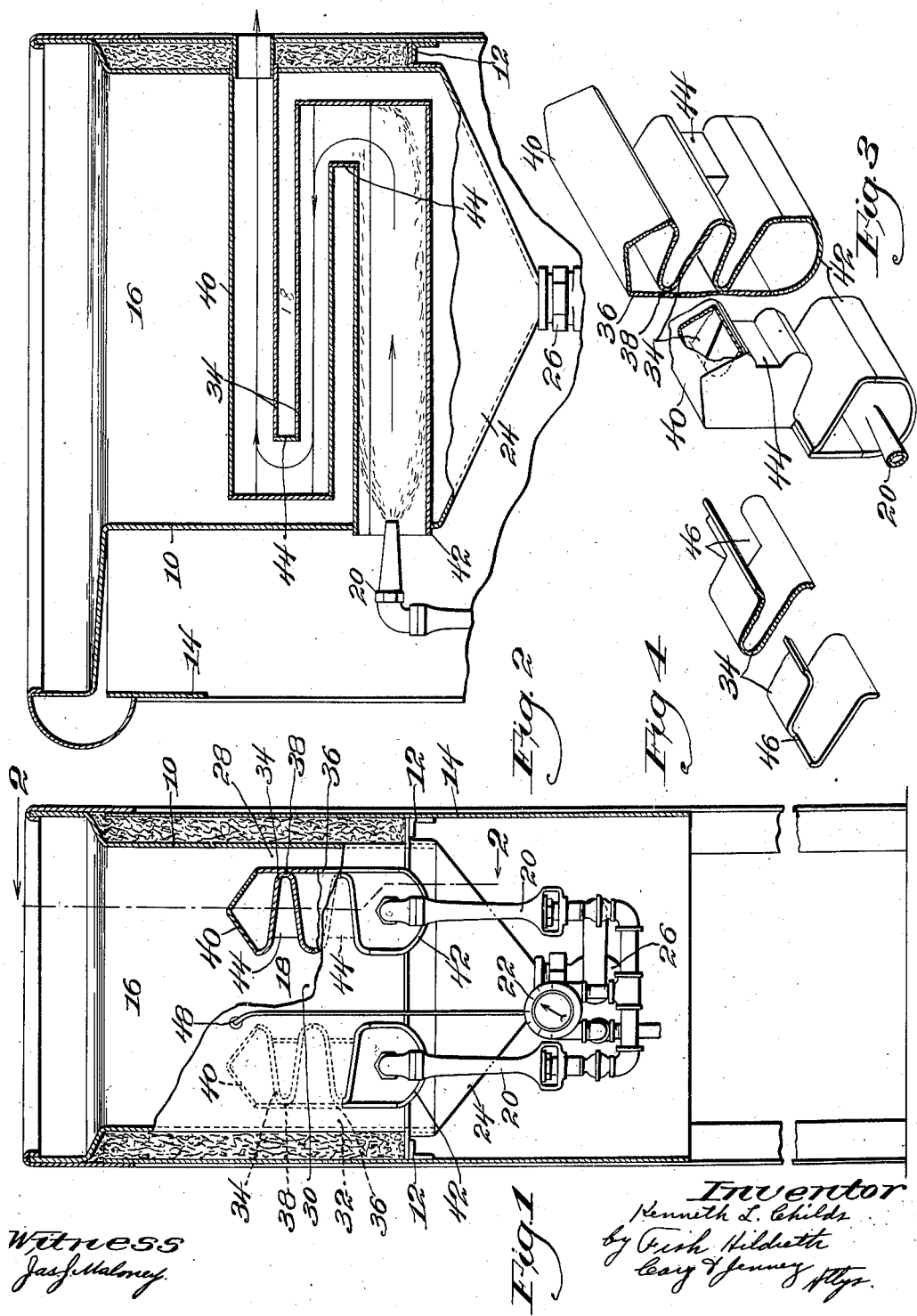

Patented July 19, 1938

2,124,186

UNITED STATES PATENT OFFICE 2,124,186

FRYING APPARATUS

Kenneth L. Childs, New Haven, Conn.

Application December 4, 1936, Serial No. 114,146

11 Claims. (Cl. 53—7)

The present invention relates to frying apparatus, and more particularly to improvements in a frying kettle heated by combustion, for maintaining a supply of fat, oil or other liquid at a suitable cooking temperature.

The usual frying apparatus comprises a kettle filled to a predetermined level with fat or cooking oil, and arranged to be maintained at a predetermined temperature during operation by a heating device, usually in the form of a gas burner with a thermostatic control therefor. The articles of food to be fried are supported in a wire basket of slightly smaller size than the kettle, which basket, when suddenly immersed in the heated fat or oil, disturbs the oil circulation due to heating and chills the oil below the proper cooking temperature. The heated surfaces within the kettle usually provide insufficient conductivity to restore the temperature of the fat or oil quickly enough to offset the chilling effect while the food remains immersed. Where large quantities of food as compared to the capacity of the kettle are being prepared, the circulation disturbance and chilling effect may be sufficient to prevent supplies of properly heated oil from coming into contact with the food, so that irregular cooking results. If more extensive heated surfaces are employed in the kettle, they usually interfere with cleaning the interior of the kettle which must be scoured frequently in order to avoid flavoring the food undesirably. To overcome these difficulties, the usual practice is to provide a relatively large capacity kettle so that the circulation disturbance produced by immersing the food will offset the chilling effect by mixing the cooled and heated portions of oil without causing such a marked drop in temperature as with a kettle of smaller capacity. Since the fat or oil in which the frying is done must be entirely renewed occasionally, the expense of this item when a relatively large kettle is used becomes an important factor in the cost of operation of the apparatus.

An object of the present invention, therefore, is to provide a novel and improved frying apparatus which may be heated by combustion with less consumption of fuel and may be maintained at a more even temperature than heretofore, without resorting to the use of a kettle of larger capacity than required to contain the articles of food being prepared or without obstructing the interior of the kettle with extended heating surfaces which are difficult to clean. A further object of the invention is to provide a compact and simplified combustion chamber which is particularly adapted to heat more efficiently than heretofore, a kettle containing fat or other liquid and to be constructed more easily than previous combustion chambers having equal exposed surface area.

With these and other objects in view, the present invention contemplates the provision in a frying kettle of a combustion chamber extending across the kettle, the enclosing walls of which form separate vertically elongated circulating channels so arranged that a substantially greater proportion of the heated enclosing wall is exposed in one of the circulating channels than in the other. By this construction substantially all of the liquid in the kettle is kept in continuous motion by convection currents and the entire portion of liquid cooled by sudden immersion of cold food will be swept in the direction of the convection currents through the circulating channels to be replaced quickly by a supply of heated liquid from a more remote part of the kettle without lowering the temperature of all of the liquid in the kettle, the cooled portions of liquid moving downwardly and being kept separated from the heated portions of liquid. A more vigorous circulation of liquid by convection currents in the kettle thus acts to keep the temperature of the liquid surrounding the food more nearly uniform. In one form of this feature of the invention the kettle is constructed with greater depth than in the usual practice, so as to have distinct zones at the upper portion for frying, at an intermediate portion for heating, and at a lower portion for collecting sediment which drops from the food being prepared, and the partition is arranged to extend vertically from the frying zone to the sediment zone to limit any substantial circulation of the liquid to movement between zones.

While the features of the invention illustrated are particularly adapted for use in frying apparatus, certain features are of more general application and are useful in heating apparatus other than a frying kettle as, for instance, a water heater or boiler. Other features of the invention including certain details of construction and combinations of parts are hereinafter described in the following detailed specification, and more particularly pointed out in the appended claims.

In the drawing, Fig. 1 is a view, in front elevation, partly broken away and shown in section, of apparatus embodying the features of the present invention; Fig. 2 is a view in section, taken along the line 2—2 of Fig. 1, showing the upper portion of the apparatus; Fig. 3 is a perspective view of the combustion chamber employed in the apparatus shown in Fig. 1; and Fig. 4 is a perspective view of an elemental portion of the combustion chamber illustrating the method of construction.

The apparatus illustrated in the drawing is a self-contained structure, similar in certain respects to that disclosed in inventor's application for U. S. Letters Patent Serial Number 88,963, filed July 6, 1936, for frying edible or other articles in fat, oil, or other liquid raised to moderately high cooking temperature in a manner commonly termed "deep fat frying". Articles of food prepared in this manner are carried beneath the surface of the heated fat or oil at a sufficient depth to insure that all parts of the article immersed will be covered by fat of substantially the same temperature. The fat is heated ordinarily in a kettle which, at its upper portion, is provided with vertical sides and between which a suitable clear depth of heated fat is contained. In order to provide means for easily removing the sediment produced by burned food or other particles, the bottom of the kettle is ordinarily formed with a centrally tapering funnel portion at the apex of which is a suitable valve or other drain device. Referring more particularly to the drawing, the kettle constructed of flat sheet metal is indicated at 10, resting on a frame 12 surrounded by an enclosure 14, the front side of which is left open. Access to the interior of the kettle is provided through the open upper portion of the enclosure 14 and the frying zone in the kettle is indicated generally by the numeral 16. Beneath the frying zone 16 is a heating zone 18 in which is mounted the combustion chambers surrounded by the fat contained in the kettle. Heat is applied inside the combustion chambers by gas burners 20 regulated by a thermostatically controlled valve 22. Beneath the heating zone 18 the kettle is formed with a funnel shaped sediment collecting zone 24 provided with the drain 26.

Frying apparatus in common use is so constructed that when a large mass of uncooked articles of food is immersed beneath the surface of the heated fat within the kettle, the fat is not only chilled so as to reduce its effective cooking temperature, but the circulation of the fat in the kettle is disturbed by irregular eddies extending substantially to the bottom of the kettle, thus stirring up carbonized particles of sediment and tending to cause them to be deposited on the articles of food in the process of preparation. Ordinarily the framework of the basket supporting the food extends sufficiently deep into the kettle, and the kettle is of such relatively shallow construction that the disturbance of the natural circulation agitates to a still greater extent the carbonized particles. In such frying apparatus the combustion chambers, usually in the form of separate passages extending across the kettle are of relatively small surface area, so that the proper temperatures in the frying zone can not be restored before the food is removed. If a larger number of heating chambers are used, proper cleaning along the surfaces beneath the combustion chamber is rendered difficult if not impossible. The small size of the usual combustion chamber also prevents a cold mass of the fat in the kettle from being brought quickly to a cooking temperature when starting the frying apparatus in operation. To offset the inability of the heating devices to restore quickly a proper frying temperature to the fat after being chilled, a relatively large quantity of fat is maintained in the kettle according to present practice, so that the average temperature of the fat will not be reduced to any great extent.

In the apparatus embodying the present invention a pair of combustion chambers are provided with relatively large exposed surface areas to transfer heat to the fat within the kettle at an extremely high rate and the enclosing walls of the combustion chambers are so arranged as to form definite vertically elongated circulating channels or cleaning wells 28, 30 and 32, respectively extending between the frying zone 16 and the sediment collecting zone 24. The combustion chambers are constructed to expose a substantially greater proportion of heated wall surface in the channel 30 than in the channels 28 and 32, to produce a strong tendency for the fat to flow upwardly in one of the channels 30, which tendency is not easily upset by mechanical movements of the food as it is immersed or withdrawn from the kettle. The channels 28 and 32 run along the sides of the kettle where the natural tendency of the fat is to flow downwardly along the cooler sides of the kettle.

Each combustion chamber is constructed of a metal sheet 34 having horizontally arranged corrugated grooves and rounded ridges and a plane partition sheet 36 extending between the frying and sediment zones. The ridges at one side of the corrugated sheet 34 are attached at spaced intervals to the plane sheet 36 by spot welding, indicated at 38. The passages formed by the corrugated sheet and the plane partition sheet extend horizontally across the heating zone of the kettle, and the uppermost and lowermost passages are completed by a trough-shaped cap 40 and a curved bottom member 42, respectively. The cap 40 and the bottom member 42 are secured to the edges of the corrugated and plane sheets by a continuous welded seam so as to prevent leakage but the joints between the ridges of the sheet 34 and the inner surface of the plane sheet 36 which are not exposed to the interior of the kettle need not be continuously secured. The partition sheet 36 of each combustion chamber thus extends vertically beyond any one heating passage in the combustion chamber and extends in a horizontal direction lengthwise of said passage in the combustion chamber. By forming each combustion chamber with the partition sheet 36 attached to the corrugated enclosing side walls of the heating passages an integral combustion chamber of relatively greater height than width is provided, all the enclosing surface walls of which are exposed to the interior of the kettle. This shape of combustion chamber is particularly adapted for use in a deep narrow frying kettle of the type illustrated in the drawing.

The heating passages are connected in a series of vertical ducts formed by cutting away adjacent portions of the corrugated sheet 34 and surrounding each opening by a rectangular enclosure piece 44 shaped to fit the space between the walls and provided with a cover portion for the ends of adjacent passages. The combustion chambers illustrated are each provided with a vertical tier of three passages so that two enclosure pieces 44 are required. The meeting edges of the enclosure pieces and the heating passages are suitably welded with a continuous seam. The inlet to the lowermost passage is formed with a horizontal portion extending through a correspondingly shaped opening in the side of the kettle which is welded in place. The opposite end of the uppermost heating passage is similarly provided with a portion extending through an opening in the opposite side of the kettle and welded in place.

To construct the corrugated sheet in the simplest manner, it is composed of structural elements, each of similar shape, as illustrated in Fig. 4. Each element is of substantially U shape cross-section, forming a single corrugation with its edges bent to provide a continuous curved ridge when joined to the edges of a similar element. The ends of each element are suitably cut away, as indicated at 46 to provide the necessary openings and projecting portions for the connecting ducts.

The two combustion chambers in the kettle are constructed with exactly the reverse configuration and are arranged in the kettle with the partition sheets 36 in parallel relation with the closer side walls of the kettle so that the circulating channels 28 and 32 will be substantially narrower than the channel 30 between the combustion chambers. The effect of this proportioning is to cause the fat to circulate faster in the narrower channels 28 and 32 than in the wider channel 30, so that particles of food escaping from the frying zone will be drawn quickly into the channels 28 and 32 and deposited in the sediment zone where the fat is somewhat cooler and where there is less likelihood of the particles becoming carbonized. The movement of the fat upwardly through the passage 30 is somewhat slower due to the greater width of this passage and there is less likelihood of the sediment particles being sucked into the frying zone. The combustion chambers are of such size that the chilling effect of newly immersed food ordinarily will be insufficient to upset the convection currents already established in the kettle and the mechanical effect of inserting a mass of food into the kettle will cause only a temporary reversal of the currents in the kettle without changing the line of circulation about the combustion chambers.

The thermostat 22 for controlling the supply of gas to the burners 20 is regulated by a temperature responsive bulb 48 disposed in the frying zone 16 directly above the exposed ridges of the corrugated sheet 34 opposite the plane partition sheet of the combustion chamber at one side of the kettle. The upwardly rising heated currents of fat thus subject the bulb 48 to the temperature of the main body of rising fat in the wider channel 30.

The invention having been specifically described, what is claimed is:

1. Heating apparatus having, in combination, a kettle, a corrugated sheet, one side of which is exposed to the interior of the kettle and a plane partition attached to unexposed ridges of the corrugated sheet to form with the sheet a parallel series of heating passages extending across the kettle.

2. Heating apparatus having, in combination, a kettle, a corrugated sheet, the ridges of which are substantially horizontal and exposed to the interior of the kettle, and a plane partition attached to unexposed ridges of the corrugated sheet to form with the sheet a vertical tier of heating passages extending horizontally across the kettle.

3. Heating apparatus having, in combination, a kettle, a corrugated sheet, the ridges of which are substantially horizontal and exposed to the interior of the kettle, a plane partition attached to unexposed ridges of the corrugated sheet to form with the sheet parallel heating passages extending across the kettle, and connecting ducts between the ends of said passages to join the passages in a series.

4. Heating apparatus having, in combination, a kettle, a corrugated sheet, the ridges of which are substantially horizontal and exposed to the interior of the kettle, a plane partition attached to unexposed ridges of the corrugated sheet to form with the sheet parallel heating passages extending across the kettle, and connecting ducts within the kettle between said passages to join the passages in a series, the heating passage at one end of the series extending through one side of the kettle to provide an inlet, and the heating passage at the other end of the series extending through an opposite side of the kettle to provide an outlet for the series.

5. Frying apparatus having, in combination, an open rectangular kettle for a cooking medium having an upper frying zone, an intermediate heating zone, and a lower sediment collecting zone, and a pair of spaced combustion chambers arranged closely to opposite sides of the kettle, each comprising a plurality of substantially horizontal heating passages with their enclosing walls exposed to the interior of the kettle in the heating zone, and a partition parallel to the closer side wall of the kettle and connected with the enclosing walls of the passages to form with the side of the kettle a vertical circulating channel between the frying and sediment zones of a width substantially less than the distance between the combustion chambers and arranged to cause a smaller proportion of the enclosing walls to be exposed within the channel including the side of the kettle, than exposed within the channel between combustion chambers.

6. A combustion chamber adapted to be surrounded by the medium to be heated comprising a corrugated sheet, a plane partition member attached to ridges at one side of the corrugated sheet to enclose grooves between the ridges, cover plates at the ends of the corrugations and ducts for connecting the enclosed grooves serially.

7. A combustion chamber adapted to be surrounded by the medium to be heated comprising a corrugated sheet, and a plane partition member joined with a continuous welded seam to opposite straight edges of the corrugated sheet and attached to ridges at one side of the corrugated sheet with a seam welded at intervals.

8. Frying apparatus having, in combination, an open kettle for a cooking medium having an upper frying zone, an intermediate heating zone and a lower sediment collecting zone and a combustion chamber of relatively greater height than width extending across the heating zone and forming with its vertical enclosing walls circulating channels between the frying zone and the sediment zone, the vertical enclosing wall exposed in one of said channels being corrugated and the opposite enclosing wall exposed in the other of said channels being of plane surface to impart a greater quantity of heat to the cooking medium in one of the circulating channels than in the other.

9. Frying apparatus having, in combination, an open rectangular kettle having an upper frying zone, an intermediate heating zone and a lower sediment collecting zone and a pair of combustion chambers, each disposed in the heating zone closer to one side of the kettle than to the other side and forming with their vertical enclosing walls circulating channels between the frying zone and the sediment zone, the vertical walls exposed in the channel between combustion chambers being corrugated and the walls exposed in the channels between a combustion chamber and the side of the kettle being of plane surface to impart a greater quantity of heat to the cooking medium in the circulating channel having corrugated walls than in the circulating channel having plain surface.

10. Frying apparatus having, in combination, an open kettle, and a combustion chamber extending across the kettle and having enclosing walls arranged to form separate vertically elongated circulating channels within the kettle, the proportion of exposed heated wall surface within the kettle being substantially greater at one side of the combustion chamber than at the other.

11. Frying apparatus having, in combination, an open kettle for a cooking medium having an upper frying zone, an intermediate heating zone, and lower sediment collecting zone, and a combustion chamber extending across the heating zone of the kettle with heated enclosing walls including a vertically extending partition exposed at one side to the interior of the kettle from the frying zone to the sediment zone to form vertically elongated circulating channels having substantially greater exposed heated wall surface at one side of the combustion chamber than at the other.

KENNETH L. CHILDS.